US012746586B2

(12) United States Patent
Li et al.

(10) Patent No.: US 12,746,586 B2
(45) Date of Patent: Sep. 29, 2026

(54) METHOD FOR IN-SITU REMEDIATION OF CONTAMINATED SOIL THROUGH MULTI-TECHNOLOGY COUPLING

(71) Applicant: BCEG ENVIRONMENT REMEDIATION CO., LTD, Beijing (CN)

(72) Inventors: Jingwen Li, Beijing (CN); Yuru Sun, Beijing (CN); Jing Lyu, Beijing (CN); Nan Guo, Beijing (CN); Peng Liu, Beijing (CN); Fuwang Wang, Beijing (CN); Dongli Liu, Beijing (CN); Juqing Zhu, Beijing (CN); Xiaoxin Yu, Beijing (CN)

(73) Assignee: BCEG ENVIRONMENT REMEDIATION CO., LTD, Beijing (CN)

( * ) Notice: Subject to any disclaimer, the term of this patent is extended or adjusted under 35 U.S.C. 154(b) by 121 days.

(21) Appl. No.: 18/759,933

(22) Filed: Jun. 30, 2024

(65) Prior Publication Data

US 2024/0359223 A1 Oct. 31, 2024

Related U.S. Application Data

(63) Continuation-in-part of application No. PCT/CN2021/143862, filed on Dec. 31, 2021.

(51) Int. Cl.

*B09C 1/00* (2006.01)
*B09C 1/06* (2006.01)
*B09C 1/08* (2006.01)

(52) U.S. Cl.

CPC .................. *B09C 1/08* (2013.01); *B09C 1/06* (2013.01); *B09C 2101/00* (2013.01)

(58) Field of Classification Search

CPC .......... B09C 1/08; B09C 2101/00; B09C 1/06
See application file for complete search history.

(56) References Cited

U.S. PATENT DOCUMENTS

| | | | | |
|---|---|---|---|---|
| 6,824,328 B1 | | 11/2004 | Vinegar et al. | |
| 2004/0126190 A1 | * | 7/2004 | Stegemeier | B09C 1/06 405/128.6 |
| 2004/0228688 A1 | * | 11/2004 | Stegemeier | B09C 1/08 405/128.15 |
| 2005/0111917 A1 | * | 5/2005 | Vinegar | B09C 1/062 405/128.4 |
| 2008/0008535 A1 | * | 1/2008 | Ball | B09C 1/02 405/128.5 |
| 2014/0255099 A1 | * | 9/2014 | Reynolds | B09C 1/085 405/128.55 |
| 2018/0319685 A1 | * | 11/2018 | Ball | C02F 1/583 |
| 2019/0193129 A1 | * | 6/2019 | Yamazaki | B09C 1/02 |

FOREIGN PATENT DOCUMENTS

| | | |
|---|---|---|
| CN | 103230933 A | 8/2013 |
| CN | 103624073 A | 3/2014 |
| CN | 106734167 A | 5/2017 |
| CN | 106799396 A | 6/2017 |
| CN | 107350278 A | 11/2017 |
| CN | 108160694 A | 6/2018 |
| CN | 109127698 A | 1/2019 |
| CN | 111069264 A | 4/2020 |
| CN | 111250524 A | 6/2020 |
| CN | 111672893 A | 9/2020 |
| CN | 112387771 A | 2/2021 |
| CN | 113277609 A | 8/2021 |

OTHER PUBLICATIONS

Li Xiangdong, "Environmental Pollution and Remediation, 1st edition," China University of Mining and Technology Press, pp. 42 (Jan. 31, 2016).

Liu Dongmei et al., "Ecological Restoration Theory and Technology, 1st edition," Harbin Institute of Technology Press, pp. 125 (May 31, 2017).

Liu Kai et al., "Research and Application Progress of in Situ Thermal Desorption technology in Contaminated Plots," China Chlor-Alkali, Issue 12 (Dec. 31, 2017).

Shanghai Survey and Design Institute (Group) Co., Ltd et al., "Technical Standards for Soil Disposal of Contaminated Soil and Groundwater in Construction Sites and Underground Construction Sites, 1st Edition," Tongji University Press, pp. 24-25 (Sep. 30, 2019).

CN First Office Action dated Oct. 13, 2022 as received in Application No. 202111666447.9.

(Continued)

*Primary Examiner* — Carib A Oquendo
(74) *Attorney, Agent, or Firm* — Maschoff Brennan

(57) ABSTRACT

The present invention provides a method for in-situ remediation of contaminated soil through multi-technology coupling. The remediation method comprises the following steps: preheating the soil at a contaminated site by using in-situ thermal conductive heating (TCH) technology, and then performing multi-phase extraction; and performing a cycle of injecting hot steam, multi-phase extraction, and injecting an oxidizing agent into the soil at the contaminated site. A system for in-situ remediation of an organically contaminated soil based on the aforementioned method for in-situ remediation of the organically contaminated soil includes a heating well, an injection well, and an extraction well. The heating well is connected to an in-situ thermal conductive heating system, and used for preheating of the soil at the contaminated site. The injection well is connected to an in-situ injection system, and used for injecting the hot steam and the oxidizing agent. The extraction well is connected to a vacuum extraction system, and used for the multi-phase extraction of the contaminated site. In the present disclosure, a pollutant removal rate of the organically contaminated soil is greatly increased by means of a combination of multiple technologies coupled together.

12 Claims, No Drawings

(56) References Cited

OTHER PUBLICATIONS

CN Second Office Action dated Mar. 3, 2023 as received in Application No. 202111666447.9.
CN Decision of Refusal dated May 11, 2023 as received in Application No. 202111666447.9.
Internation Search Report and Written Opinion dated Sep. 16, 2022 as received in application No. PCT/CN2021/143862.

* cited by examiner

METHOD FOR IN-SITU REMEDIATION OF CONTAMINATED SOIL THROUGH MULTI-TECHNOLOGY COUPLING

CROSS REFERENCE TO RELATED APPLICATIONS

The present application is a partial continuation application of international application PCT/CN2021/143862, filed on Dec. 31, 2021 and entitled "METHOD FOR IN-SITU REMEDIATION OF CONTAMINATED SOIL THROUGH MULTI-TECHNOLOGY COUPLING", the entire contents of which are incorporated herein by reference.

TECHNICAL FIELD

The present disclosure relates to the technical field of remediation of organically contaminated soils, in particular to a method for in-situ remediation of contaminated soil through multi-technology coupling.

BACKGROUND

The coking industry is a basic industry in the industrial field and occupies a significant position in economic and social development. In recent years, the state has intensified the adjustment of high-energy-consuming and high-polluting industries. Meanwhile, with the implementation of the strategy of "retreating from the secondary industry and entering the tertiary industry" in the urban layout, some coking enterprises have successively relocated from original sites for reconstruction. Soil of these left sites contains a large number of polycyclic aromatic hydrocarbons, benzene series, total petroleum hydrocarbons and other organic pollutants, which poses a potential threat to the health of surrounding residents. Therefore, there is an urgent need for remediation and treatment of organically contaminated sites left behind after the relocation and closure of the coking enterprises.

At present, common technologies for soil remediation of organically contaminated sites in China are mostly dominated by ex-situ treatment technologies, but there are problems such as the high difficulty of preventing and controlling secondary contamination, and the difficulty of absorbing the remediated soil, which seriously limits the sustainable promotion of the treatment and remediation of this type of sites. In-situ remediation is a direct treatment on contaminated land, and compared with ex-situ remediation, it has the characteristics of low investment, small disturbance to the soil, being free of secondary contamination, etc. However, there is still a problem of a low pollutant removal rate in the current in-situ remediation technology.

SUMMARY OF THE INVENTION

Therefore, a technical problem to be solved by the present disclosure is to overcome a defect of a low pollutant removal rate in the prior art.

Therefore, the present disclosure provides a method for in-situ remediation of organically contaminated soil. The remediation method includes the following steps:

- preheating the soil at a contaminated site by using in-situ thermal conductive heating (TCH) technology, and then performing multi-phase extraction; and
- performing a cycle of injecting hot steam, multi-phase extraction, and injecting an oxidizing agent into the soil at the contaminated site.

Further, the oxidizing agent includes a hydrogen peroxide solution and persulfate.

Further, the number of cycles is not less than two; and the oxidizing agent added in the last cycle is persulfate, and the oxidizing agent added in the rest of the cycles is the hydrogen peroxide solution.

Further, a concentration of hydrogen peroxide solution is in a range from 5 wt % to 10 wt %.

Further, a concentration of the hydrogen peroxide solution is in a range from 5% to 7.5%. According to physicochemical properties of hydrogen peroxide and safety management experience, hydrogen peroxide with a concentration of 7.5% or more is more likely to undergo a decomposition reaction, releasing oxygen and increasing the risk of combustion and explosion.

Further, mass of the injected persulfate is 0.5% to 5% of mass of the contaminated soil.

Further, the mass of the persulfate injected in a single round is 0.5% to 1% of the mass of the contaminated soil, and a method of multiple rounds of injections at a low concentration (0.5%) is prioritized for a better remediation effect with the same cumulative addition amount.

Further, mass of the injected hydrogen peroxide solution is 1% to 5% of the mass of the contaminated soil.

Further, the mass of the persulfate injected in a single round is 1% to 5% of the mass of the contaminated soil, and a method of multiple rounds of injections at a low concentration (1%) is prioritized for a better remediation effect with the same cumulative addition amount.

Further, a soil temperature is in a range from 40° C. to 80° C. after the hot steam is injected;

- and/or, the soil temperature is in a range from 40° C. to 50° C. when the oxidizing agent is injected;
- and/or, the soil temperature is in a range from 40° C. to 100° C. after the preheating.

Further, a soil temperature is in a range from 40° C. to 60° C. after the hot steam is injected;

- and/or, the soil temperature is in a range from 40° C. to 50° C. when the oxidizing agent is injected;
- and/or, the soil temperature is in a range from 80° C. to 100° C. after the preheating.

Further, efficiency of the multi-phase extraction is in a range from 0.1 $Nm^3/h$ to 0.3 $Nm^3/h$ per cubic meter of soil.

The present disclosure provides a system for in-situ remediation of organically contaminated soil based on the aforementioned method for in-situ remediation of the organically contaminated soil, wherein the system includes:

- a heating well, connected to an in-situ thermal conductive heating system, and used for preheating of the soil at a contaminated site;
- an injection well, connected to an in-situ injection system, and used for injecting hot steam and an oxidizing agent; and
- an extraction well, connected to a vacuum extraction system, and used for multi-phase extraction of the contaminated site.

Further, the injection well and the extraction well are horizontal wells.

In some implementations, the hydrogen peroxide solution is first used as the oxidizing agent, with the number of cycles not less than three; and then sodium persulfate is used as the oxidizing agent. The procedure may be performed in multiple rounds to achieve a remediation effect.

In some implementations, with the method for in-situ remediation of the organically contaminated soil, the soil at the contaminated site is preheated by using in-situ thermal conductive heating (TCH) technology, and then when multi-phase extraction is performed, a VOCs online monitoring device is installed at a tail water and exhaust collection opening to monitor a change of a concentration of VOCs in exhaust. When the concentration of VOCs is very low or there is basically no trend of further reduction, the operation of the procedure is stopped, and the next procedure is performed.

In some implementations, with the method for in-situ remediation of the organically contaminated soil, soil temperature monitoring systems are installed at different depths and in different planar positions, and the oxidizing agent is injected through horizontal wells after monitored temperatures reach a target temperature (40° C. to 50° C.) and are evenly distributed. Pressure monitoring systems are installed at the site at different depths and in different planar positions. When surging slurry is found at the site or a local position pressure is high, the injection is stopped, and a local gas-phase extraction mode is used to promote the reaction and diffusion of the agent.

A technical solution of the present disclosure has the following advantages. 1. The method for in-situ remediation of the organically contaminated soil provided by the present disclosure greatly increases the pollutant removal rate of the organically contaminated soil with coupling combination of an in-situ thermal conductive heating technology, multi-phase extraction technology, an in-situ steam heat enhanced extraction technology, and an in-situ chemical oxidation technology.

Specifically, through the multi-technology coupling combination, removal of volatile pollutants in the soil is promoted, oxygen consumption of organic matter in the soil is reduced, and competitive oxidation of volatile pollutants and semi-volatile pollutants in a subsequent step is avoided, which is conducive to the reduction of agent consumption in subsequent remediation with the oxidizing agent.

Then, through the multi-technology coupling combination, on the one hand, the in-situ steam heat enhanced extraction increases the soil temperature, which in turn promotes the dissolution of pollutants in the soil from a solid phase to a liquid phase, so that the pollutants effectively come into contact with the oxidizing agent to be dissolved out. On the other hand, steam heating supplements the soil with water, creating a good mass transfer environment for an oxidation reaction.

In summary, the present disclosure solves problems of a poor oxidation effect of PAHs and other semi-volatile pollutants and high consumption of the oxidizing agent through the multi-technology coupling combination.

2. In the method for in-situ remediation of the organically contaminated soil provided by the present disclosure, due to the multi-technology coupling combination, on the one hand, when heated with the in-situ thermal conductive heating technology, the soil only needs to be heated to be in a range from 40° C. to 100° C. Compared with a traditional in-situ thermal conduction heating technology that needs heating to be in a range from 500° C. to 700° C. and then performs extraction, it greatly reduces energy consumption. On the other hand, when the hot steam is injected to heat the soil with the in-situ steam heat enhanced extraction technology, the soil only needs to be heated to be in a range from 40° C. to 80° C. and then cooled down and stabilized to be in a range from 40° C. to 50° C., which further reduces the energy consumption compared with the traditional in-situ steam heat enhanced extraction technology that needs heating to be in a range from 100° C. to 200° C.

3. In the method for in-situ remediation of the organically contaminated soil provided by the present disclosure, when with the in-situ steam heat enhanced extraction technology, the hot steam is injected to heat the soil to be in a range from 40° C. to 80° C. and then the soil is cooled down and stabilized to be in a range from 40° C. to 50° C., the temperature range may fully activate the oxidizing agent and enhance an oxidation ability, and fast self degradation is not prone to occurring, so that the oxidizing agent can be fully utilized, thus reducing the consumption of the oxidizing agent.

4. According to the method for in-situ remediation of the organically contaminated soil provided by the present disclosure, in a remediation phase with the oxidizing agent, multiple rounds of oxidation injections are performed with the oxidizing agent of the hydrogen peroxide solution, followed by a final injection of a persulfate system. In a case of the same number of electrons produced, theoretical consumption of the hydrogen peroxide solution is only one seventh of theoretical consumption of the persulfate, a purchase cost ratio of the corresponding agents is 1:(10-20), and the cost of the hydrogen peroxide solution is relatively low. Persulfate has a characteristic of slow-release oxidation and may effectively make contact and react with the contaminated soil for a long time, while the hydrogen peroxide solution reacts rapidly without an effect of long-time mass-transfer reaction. Therefore, the hydrogen peroxide solution is first used for the multiple rounds of oxidation injections to maximally and rapidly reduce the oxygen consumption of organic matter in the soil and remove TPH and other pollutants with high concentration background values, and then persulfate is injected to achieve an effect of long-lasting and targeted oxidation of PAHs and other difficult-to-degrade organic matter by persulfate. The combined oxidizing agent usage mode may not only achieve the optimal oxidation effect and reduce an overall agent invested cost, but also greatly reduce an addition amount of the sulfate radical-generating persulfate agent, which has a characteristic of environmental friendliness.

5. The method for in-situ remediation of the organically contaminated soil provided by the present disclosure is applicable to a complex site environment, and has a small impact on the soil environment. The whole process is free of secondary contamination, meets the needs of remediation of different contaminated sites, saves remediation input costs, consumes less energy, and has green and sustainable advantages. It is proved according to an engineering test that the present disclosure is reasonable and efficient in design. Not only can the organic pollutants in the soil that are difficult to oxidize and degrade be remediated to a target value and can the cost of agents be saved by 50% or more compared with a general chemical oxidation process, but also the overall energy consumption is only ⅓-⅕ of that of traditional in-situ/ex-situ thermal desorption.

DETAILED DESCRIPTION

The following embodiments are provided for a better and further understanding of the present disclosure, are not limited to the best implementation, and do not constitute a limitation on the contents and scope of protection of the present disclosure, and any product identical or similar to the present disclosure obtained by any person under the inspiration of the present disclosure or by combining the present disclosure with features of other prior art falls within the scope of protection of the present disclosure.

Embodiments where specific experimental steps or conditions are not indicated may be performed according to operations or conditions of conventional experimental steps described in the literature in the field. Reagents or instruments used without indicating manufacturers are all routine reagent products that are commercially available.

Contaminated soil is the to-be-remediated soil contaminated by benzo(a)pyrene and total petroleum hydrocarbon ($C_{10}$-$C_{40}$).

Embodiment 1

The present embodiment provides a method for in-situ remediation of organically contaminated soil. The remediation method includes the following steps.

S1, according to a contamination scope of a contaminated site, a heating well, injection wells, and extraction wells are arranged at the contaminated site. The heating well is connected to an in-situ thermal conductive heating system. The injection wells are connected to an in-situ injection system. The extraction wells are connected to a vacuum extraction system. The heating well is a vertical well. The injection wells and the extraction wells are horizontal wells. Horizontal sections where the injection wells and the extraction wells are arranged are in a regular quadrangle. The injection wells are arranged at four corners of each regular quadrangle, and the extraction wells are arranged at centers of the regular quadrangles.

S2, a heating rod in the in-situ thermal conductive heating system is set to 600° C., the surrounding soil is heated to be in a range from 40° C. to 60° C., and then heating is stopped. Multi-phase extraction is then performed by the vacuum extraction system at efficiency of 0.3 $Nm^3/h$ per cubic meter of soil, and some pollutants transferred to a gas phase are collected on the ground, and treated via a spray tower, a separator, and a heat exchanger to a wastewater exhaust treatment system.

S3, hot steam and an oxidizing agent are injected circularly through a steam generator and the in-situ injection system respectively, and the multi-phase extraction is performed circularly through the vacuum extraction system (the multi-phase extraction is performed at the efficiency of 0.3 $Nm^3/h$ per cubic meter of soil), with a specific cycle order being procedure A-extraction-procedure B-procedure A-extraction-procedure B-procedure A-extraction-procedure C.

Procedure A: the hot steam with a temperature in a range from 170° C. to 180° C. is generated by the steam generator and injected through the injection wells to heat the soil to a temperature in a range from 60° C. to 80° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 10 wt % is injected into the soil through the in-situ injection system, with mass of the injected hydrogen peroxide solution being 5% of mass of the contaminated soil.

Procedure C: after the soil temperature is stabilized, sodium persulfate is injected through the injection system, with mass of the injected sodium persulfate being 5% of the mass of the contaminated soil.

After the above steps are completed, maintenance is performed for two weeks.

Embodiment 2

The present embodiment provides a method for in-situ remediation of organically contaminated soil. The remediation method includes the following steps.

S1, according to a contamination scope of a contaminated site, a heating well, injection wells, and extraction wells are arranged at the contaminated site. The heating well is connected to an in-situ thermal conductive heating system. The injection wells are connected to an in-situ injection system. The extraction wells are connected to a vacuum extraction system. The heating well is a vertical well. The injection wells and the extraction wells are horizontal wells. Horizontal sections where the injection wells and the extraction wells are arranged are in a regular quadrangle. The injection wells are arranged at four corners of each regular quadrangle, and the extraction wells are arranged at centers of the regular quadrangle s.

S2, a heating rod in the in-situ thermal conductive heating system is set to 600° C., the surrounding soil is heated to be in a range from 80° C. to 100° C., and then heating is stopped. Multi-phase extraction is then performed by the vacuum extraction system at efficiency of 0.1 $Nm^3/h$ per cubic meter of soil, and some pollutants transferred to a gas phase are collected on the ground, and treated via a spray tower, a separator, and a heat exchanger to a wastewater exhaust treatment system.

S3, hot steam and an oxidizing agent are injected circularly through a steam generator and the in-situ injection system respectively, and the multi-phase extraction is performed circularly through the vacuum extraction system (the multi-phase extraction is performed at efficiency of 0.3 $Nm^3/h$ per cubic meter of soil), with a specific cycle order being procedure A-extraction-procedure B-procedure A-extraction-procedure B-procedure A-extraction-procedure C.

Procedure A: the hot steam with a temperature in a range from 100° C. to 125° C. is generated by the steam generator and injected through the injection wells to heat the soil to a temperature in a range from 40° C. to 50° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 5 wt % is injected into the soil through the in-situ injection system, with mass of the injected hydrogen peroxide solution being 1% of mass of the contaminated soil.

Procedure C: after the soil temperature is stabilized, sodium persulfate is injected through the injection system, with mass of the injected sodium persulfate being 0.5% of the mass of the contaminated soil.

After the above steps are completed, maintenance is performed for two weeks.

Embodiment 3

The present embodiment provides a method for in-situ remediation of an organically contaminated soil. The remediation method includes the following steps.

S1, according to a contamination scope of a contaminated site, a heating well, injection wells, and extraction wells are arranged at the contaminated site. The heating well is connected to an in-situ thermal conductive heating system. The injection wells are connected to an in-situ injection system. The extraction wells are connected to a vacuum extraction system. The heating well is a vertical well. The injection wells and the extraction wells are horizontal wells. Horizontal sections where the injection wells and the extraction wells are arranged are in a regular quadrangle. The injection wells are arranged at four corners of each regular quadrangle, and the extraction wells are arranged at centers of the regular quadrangles.

S2, a heating rod in the in-situ thermal conductive heating system is set to 600° C., the surrounding soil is heated to be in a range from 80° C. to 100° C., and then heating is stopped. Multi-phase extraction is then performed by the vacuum extraction system at efficiency of 0.1 $Nm^3/h$ per cubic meter of soil, and some pollutants transferred to a gas phase are collected on the ground, and treated via a spray tower, a separator, and a heat exchanger to a wastewater exhaust treatment system.

S3, hot steam and an oxidizing agent are injected circularly through a steam generator and the in-situ injection system respectively, and the multi-phase extraction is performed circularly through the vacuum extraction system (the multi-phase extraction is performed at the efficiency of 0.3 $Nm^3/h$ per cubic meter of soil), with a specific cycle order being procedure A-extraction-procedure B-procedure A-extraction-procedure B-procedure A-extraction-procedure B-procedure A-extraction-procedure C-procedure A-extraction-procedure C.

Procedure A: the hot steam with a temperature in a range from 100° C. to 125° C. is generated by the steam generator and injected through the injection wells to heat the soil to a temperature in a range from 40° C. to 50° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 5 wt % is injected into the soil through the in-situ injection system, with mass of the injected hydrogen peroxide solution being 1% of mass of the contaminated soil.

Procedure C: after the soil temperature is stabilized, sodium persulfate is injected through the injection system, with mass of the injected sodium persulfate being 0.5% of the mass of the contaminated soil.

After the above steps are completed, maintenance is performed for two weeks.

Comparative Example 1

The present comparative example provides a method for in-situ remediation of organically contaminated soil. The remediation method includes the following steps.

S1, according to a contamination scope of a contaminated site, injection wells are arranged at the contaminated site. The injection wells are connected to an in-situ injection system. A horizontal section where the injection wells and extraction wells are arranged is in a remediation.

S2, hot steam and an oxidizing agent are injected circularly through a steam generator and the in-situ injection system respectively, and multi-phase extraction is performed circularly through a vacuum extraction system (the multi-phase extraction is performed at efficiency of 0.3 $Nm^3/h$ per cubic meter of soil), with a specific cycle order being procedure A-extraction-procedure B-procedure A-extraction-procedure B-procedure A-extraction-procedure C.

Procedure A: the hot steam with a temperature in a range from 170° C. to 180° C. is generated by the steam generator and injected through the injection wells to heat the soil to a temperature in a range from 60° C. to 80° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 10 wt % is injected into the soil through the in-situ injection system, with mass of the injected hydrogen peroxide solution being 5% of mass of the contaminated soil.

Procedure C: after the soil temperature is stabilized, sodium persulfate is injected through the injection system, with mass of the injected sodium persulfate being 5% of the mass of the contaminated soil.

After the above steps are completed, maintenance is performed for two weeks.

Comparative Example 2

The present comparative example provides a method for in-situ remediation of organically contaminated soil. The remediation method includes the following steps.

S1, according to a contamination scope of a contaminated site, a heating well, injection wells, and extraction wells are arranged at the contaminated site. The heating well is connected to an in-situ thermal conductive heating system. The injection wells are connected to an in-situ injection system. The extraction wells are connected to a vacuum extraction system. The heating well is a vertical well. The injection wells and the extraction wells are horizontal wells. Horizontal sections where the injection wells and the extraction wells are arranged are in a regular quadrangle. The injection wells are arranged at four corners of each regular quadrangle, and the extraction wells are arranged at centers of the regular quadrangles.

S2, a heating rod in the in-situ thermal conductive heating system is set to 600° C., the surrounding soil is heated to be in a range from 40° C. to 60° C., and then heating is stopped. Multi-phase extraction is then performed by the vacuum extraction system at efficiency of 0.3 $Nm^3/h$ per cubic meter of soil, and some pollutants transferred to a gas phase are collected on the ground, and treated via a spray tower, a separator, and a heat exchanger to a wastewater exhaust treatment system.

S3, hot steam is injected circularly through a steam generator connected to the injection wells, and multi-phase extraction is performed circularly through a vacuum extraction system (the multi-phase extraction is performed at efficiency of 0.3 $Nm^3/h$ per cubic meter of soil), with a specific cycle order being procedure A-extraction-procedure B-procedure A-extraction-procedure B-procedure A-extraction.

Procedure A: the hot steam with a temperature in a range from 170° C. to 180° C. is generated by the steam generator and injected through the injection wells to heat the soil to a temperature in a range from 60° C. to 80° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 10 wt % is injected into the soil through the in-situ injection system, with mass of the injected hydrogen peroxide solution being 5% of mass of the contaminated soil.

After the above steps are completed, maintenance is performed for two weeks.

Comparative Example 3

The present comparative example provides a method for in-situ remediation of organically contaminated soil. The remediation method includes the following steps.

S1, according to a contamination scope of a contaminated site, injection wells and extraction wells are arranged at the contaminated site. The injection wells are connected to an in-situ injection system. The extraction wells are connected to a vacuum extraction system. The injection wells and the extraction wells are horizontal wells. Horizontal sections where the injection wells and extraction wells are arranged are in a regular quadrangle. The injection wells are arranged at four corners of each regular quadrangle, and the extraction wells are arranged at centers of the regular quadrangles.

S2, multi-phase extraction is performed by the vacuum extraction system at efficiency of 0.3 $Nm^3/h$ per cubic meter of soil, and some pollutants transferred to a gas phase are collected on the ground, and treated via a spray tower, a separator, and a heat exchanger to a wastewater exhaust treatment system.

S3, hot steam and an oxidizing agent are injected circularly through a steam generator and the in-situ injection system respectively, and multi-phase extraction is performed circularly through the vacuum extraction system (the multi-phase extraction is performed at efficiency of 0.3 $Nm^3/h$ per cubic meter of soil), with a specific cycle order being procedure A-extraction-procedure B-procedure A-extraction-procedure B-procedure A-extraction-procedure C.

Procedure A: the hot steam with a temperature in a range from 170° C. to 180° C. is generated by the steam generator and injected through the injection wells to heat the soil to a temperature in a range from 60° C. to 80° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 10 wt % is injected into the soil through the in-situ injection system, with mass of the injected hydrogen peroxide solution being 5% of mass of the contaminated soil.

Procedure C: after the soil temperature is stabilized, sodium persulfate is injected through the injection system, with mass of the injected sodium persulfate being 5% of the mass of the contaminated soil.

After the above steps are completed, maintenance is performed for two weeks.

Comparative Example 4

The present comparative example provides a method for in-situ remediation of organically contaminated soil. The remediation method includes the following steps.

S1, according to a contamination scope of a contaminated site, a heating well and an injection well are arranged at the contaminated site. The heating well is connected to an in-situ thermal conductive heating system. The injection well is connected to an in-situ injection system. The heating well is a vertical well. The injection well is a horizontal well.

S2, a heating rod in the in-situ thermal conductive heating system is set to 600° C., the surrounding soil is heated to be in a range from 40° C. to 60° C., and then heating is stopped.

S3, hot steam and an oxidizing agent are injected circularly through a steam generator and the in-situ injection system respectively, and multi-phase extraction is performed circularly through a vacuum extraction system (the multi-phase extraction is performed at efficiency of 0.3 $Nm^3/h$ per cubic meter of soil), with a specific cycle order being procedure A-extraction-procedure B-procedure A-extraction-procedure B-procedure A-extraction-procedure C.

Procedure A: the hot steam with a temperature in a range from 170° C. to 180° C. is generated by the steam generator and injected through the injection well to heat the soil to a temperature in a range from 60° C. to 80° C., and then the injection of the hot steam is stopped, waiting for the soil temperature to be stabilized to be in a range from 40° C. to 50° C.

Procedure B: after the soil temperature is stabilized, a hydrogen peroxide solution with a concentration of 10 wt % is injected into the soil through the in-situ injection system, with mass of the injected hydrogen peroxide solution being 5% of mass of the contaminated soil.

Procedure C: after the soil temperature is stabilized, sodium persulfate is injected through the injection system, with mass of the injected sodium persulfate being 5% of the mass of the contaminated soil.

After the above steps are completed, maintenance is performed for two weeks.

Comparative Example 5

The present comparative example provides a method for in-situ remediation of organically contaminated soil. The remediation method includes the following steps.

S1, according to a contamination scope of a contaminated site, a heating well, injection wells, and extraction wells are arranged at the contaminated site. The heating well is connected to an in-situ thermal conductive heating system. The injection wells are connected to an in-situ injection system. The extraction wells are connected to a vacuum extraction system. The heating well is a vertical well. The injection wells and the extraction wells are horizontal wells. Horizontal sections where the injection wells and the extraction wells are arranged are in a regular quadrangle. The injection wells are arranged at four corners of each regular quadrangle, and the extraction wells are arranged at centers of the regular quadrangles.

S2, a heating rod in the in-situ thermal conductive heating system is set to 600° C., the surrounding soil is heated to be in a range from 40° C. to 60° C., and then heating is stopped. Multi-phase extraction is then performed by the vacuum extraction system at efficiency of 0.3 $Nm^3/h$ per cubic meter of soil, and some pollutants transferred to a gas phase are collected on the ground, and treated via a spray tower, a separator, and a heat exchanger to a wastewater exhaust treatment system.

S3, an oxidizing agent is injected circularly through the in-situ injection system, with a specific cycle order being procedure B-procedure B-procedure C.

Procedure B: after the soil temperature is stabilized, a hydrogen peroxide solution with a concentration of 10 wt % is injected into the soil through the in-situ injection system, with mass of the injected hydrogen peroxide solution being 5% of mass of the contaminated soil.

Procedure C: after the soil temperature is stabilized, sodium persulfate is injected through the injection system, with mass of the injected sodium persulfate being 5% of the mass of the contaminated soil.

After the above steps are completed, maintenance is performed for two weeks.

Test Example 1

The soils remediated in Embodiments 1-2 and Comparative examples 1-5 are tested and analyzed, a degradation rate of the target pollutants (benzo(a)pyrene and total petroleum hydrocarbon ($C_{10}$-$C_{40}$)) is calculated, and the degradation rate is a removal rate of the target pollutants. Degradation rate of target pollutants is equal to (pollutant concentration in soil before remediation minus pollutant concentration in soil after remediation) divided by pollutant concentration in soil before remediation multiplied by 100%. Test results are shown in Table 1:

TABLE 1

Degradation rates of pollutants

| Test | Degradation rate/(%) of Benzo(a)pyrene | Degradation rate of total petroleum hydrocarbon ($C_{10}$-$C_{40}$)/ (benzo(a)) |
|---|---|---|
| Embodiment 1 | 91.2 | 94.5 |
| Embodiment 2 | 90.8 | 92.3 |
| Embodiment 3 | 92.2 | 96.3 |
| Comparative example 1 | 22.1 | 19.8 |
| Comparative example 2 | 31.6 | 35.9 |
| Comparative example 3 | 24.6 | 23.2 |
| Comparative example 4 | 39.5 | 48.2 |
| Comparative example 5 | 21.6 | 23.3 |

As can be seen from Embodiments 1-3 and Comparative Documents 1-5 in Table 1, during the remediation of the organically contaminated soils, a coupling effect is achieved among an in-situ thermal conductive heating technology, a multi-phase extraction technology, an in-situ steam heat enhanced extraction technology, and an in-situ chemical oxidation technology, thus with the coupling combination of the above technologies, the removal rate of the organically pollutants is greatly increased, and the degradation rate of benzo(a)pyrene and the degradation rate of total petroleum hydrocarbon ($C_{10}$-$C_{40}$) are increased.

As can be seen from Embodiments 1-3 in Table 1, Embodiment 3 of the present application differs from Embodiment 2 only in that Embodiment 3 performs three cycles of procedure A-extraction-procedure B and two cycles of procedure A-extraction-procedure C, whereas Embodiment 2 performs two cycles of procedure A-extraction-procedure B and one cycle of procedure A-extraction-procedure C. The degradation rate of benzo(a)pyrene and the degradation rate of total petroleum hydrocarbon ($C_{10}$-$C_{40}$) are higher in Embodiment 3 than in Embodiment 2. At the same time, the total amount of hydrogen peroxide injected in Embodiment 3 is less than the total amount of hydrogen peroxide injected in Embodiment 1, but the degradation rate of benzo(a)pyrene and the degradation rate of total petroleum hydrocarbon ($C_{10}$-$C_{40}$) are also higher than those of Embodiment 1.

Obviously, the above embodiments are only examples for clear illustration and are not a limitation of the implementations. For those of ordinary skill in the art, other variations or changes in different forms may further be made on the basis of the above illustration. It is neither necessary nor possible to exhaust all implementations herein. Obvious variations or changes derived therefrom remain within the scope of protection of the present disclosure.

The invention claimed is:

1. A method for in-situ remediation of organically contaminated soil, wherein the method comprises the following steps:

preheating soil at a contaminated site by using in-situ thermal conductive heating (TCH) technology and then performing multi-phase extraction; and performing a cycle of injecting hot steam, multi-phase extraction, and injecting an oxidizing agent into the soil at the contaminated site;

wherein the oxidizing agent comprises a hydrogen peroxide solution and persulfate;

wherein the method comprises performing a plurality of cycles; and the oxidizing agent added in a final cycle of the plurality of cycles is persulfate, and the oxidizing agent added in remaining cycles of the plurality of cycles is the hydrogen peroxide solution;

wherein the soil temperature is in a range from 40° C. to 50° C. when the oxidizing agent is injected;

wherein efficiency of the multi-phase extraction is in a range from 0.1 $Nm^3/h$ to 0.3 $Nm^3/h$ per cubic meter of soil.

2. The method for in-situ remediation of the organically contaminated soil according to claim 1, wherein a concentration of hydrogen peroxide solution is in a range from 5 wt % to 10 wt %.

3. The method for in-situ remediation of the organically contaminated soil according to claim 2, wherein mass of the injected persulfate is 0.5% to 5% of mass of the contaminated soil.

4. The method for in-situ remediation of the organically contaminated soil according to claim 1, wherein mass of the injected persulfate is 0.5% to 5% of mass of the contaminated soil.

5. The method for in-situ remediation of the organically contaminated soil according to claim 1, wherein mass of the injected hydrogen peroxide solution is 1% to 5% of the mass of the contaminated soil.

6. The method for in-situ remediation of the organically contaminated soil according to claim 1, wherein a soil temperature is in a range from 40° C. to 80° C. after the hot steam is injected;

and/or, the soil temperature is in a range from 40° C. to 100° C. after the preheating.

7. The method for in-situ remediation of the organically contaminated soil according to claim 6, wherein a soil temperature is in a range from 40° C. to 60° C. after the hot steam is injected;

and/or, the soil temperature is in a range from 80° C. to 100° C. after the preheating.

8. A system for in-situ remediation of organically contaminated soil based on the method for in-situ remediation of the organically contaminated soil according to claim 1, wherein the system comprises:

a heating well, connected to an in-situ thermal conductive heating system, and used for preheating of soil at a contaminated site;

an injection well, connected to an in-situ injection system, and used for injecting hot steam and an oxidizing agent; and an extraction well, connected to a vacuum extraction system, and used for multi-phase extraction of the contaminated site.

9. The system for in-situ remediation of the organically contaminated soil according to claim 8, wherein the injection well and the extraction well are horizontal wells.

10. The method for in-situ remediation of the organically contaminated soil according to claim 1, wherein the hydrogen peroxide solution is first used as the oxidizing agent, with the number of cycles not less than three; and then sodium persulfate is used as the oxidizing agent.

11. The method for in-situ remediation of the organically contaminated soil according to claim 1, wherein a VOCs online monitoring device is used for monitoring a change of a VOCs concentration in exhaust when the multi-phase extraction is performed.

12. The method for in-situ remediation of the organically contaminated soil according to claim 1, wherein the method further comprises using a soil temperature monitoring system to monitor a soil temperature, so that the soil temperature reaches a target temperature and is evenly distributed, the target temperature being in a range from 40° C. to 50° C.; and using a pressure monitoring system to monitor whether surging slurry is found at the site or to monitor a local position pressure.

* * * * *